US012770486B2

(12) United States Patent
Koshy et al.

(10) Patent No.: US 12,770,486 B2
(45) Date of Patent: Oct. 20, 2026

(54) MULTIMODAL SYSTEM FOR HUMAN DETECTION AND ACTIVITY TRANSMISSION IN VEHICLES

(71) Applicant: Adeia Guides Inc., San Jose, CA (US)

(72) Inventors: Kamal J. Koshy, Aurora, CO (US); Dhananjay Lal, Englewood, CO (US); Jean-Yves Couleaud, Mission Viejo, CA (US)

(73) Assignee: Adeia Guides Inc., San Jose, CA (US)

( * ) Notice: Subject to any disclaimer, the term of this patent is extended or adjusted under 35 U.S.C. 154(b) by 48 days.

(21) Appl. No.: 18/669,296

(22) Filed: May 20, 2024

(65) Prior Publication Data

US 2025/0356749 A1 Nov. 20, 2025

(51) Int. Cl.

| | |
|---|---|
| ***G08B 21/02*** | (2006.01) |
| ***B60R 16/023*** | (2006.01) |
| ***H04W 4/38*** | (2018.01) |
| ***H04W 4/40*** | (2018.01) |

(52) U.S. Cl.

CPC ........ *G08B 21/0202* (2013.01); *B60R 16/023* (2013.01); *H04W 4/38* (2018.02); *H04W 4/40* (2018.02)

(58) Field of Classification Search

None

See application file for complete search history.

(56) References Cited

U.S. PATENT DOCUMENTS

| | | | | |
|---|---|---|---|---|
| 9,845,050 | B1 * | 12/2017 | Garza | G08B 21/0205 |
| 11,250,685 | B2 * | 2/2022 | Taylor | G01S 13/04 |
| 11,577,688 | B2 * | 2/2023 | Srivastava | B60R 25/01 |
| 11,631,316 | B2 * | 4/2023 | Yu | A61B 5/746 701/45 |
| 11,804,123 | B2 * | 10/2023 | Clemmons-Trigueros | G08B 21/0205 |
| 11,887,602 | B1 * | 1/2024 | Wilson | G06F 3/165 |
| 2016/0316503 | A1 * | 10/2016 | Raphael | H04W 4/80 |
| 2018/0056784 | A1 * | 3/2018 | Virgilio | B60K 28/066 |
| 2019/0108837 | A1 * | 4/2019 | Christoph | G10L 15/30 |
| 2020/0058210 | A1 * | 2/2020 | Williams | B60N 2/0024 |
| 2022/0153227 | A1 * | 5/2022 | Srivastava | B60R 25/31 |
| 2022/0308195 | A1 * | 9/2022 | Zeng | G01S 13/003 |

(Continued)

OTHER PUBLICATIONS

Algorized, "Perception Enabled Technology", available online at: <https://www.algorized.com/technology>, retrieved on Jul. 23, 2024, (3 pages).

(Continued)

*Primary Examiner* — Muhammad Adnan

(74) *Attorney, Agent, or Firm* — HG LAW LLP

(57) ABSTRACT

Systems and methods are provided herein for detecting a child in a vehicle and then notifying a user and/or emergency service about the detected child. This may be accomplished by processing channel state information (CSI) and audio information related to the inside of a vehicle. The CSI may be generated using radio frequency (RF) sensors placed throughout the vehicle and the audio information may be generated using microphones placed throughout the vehicle. The system may detect a child within the vehicle using both the CSI and the audio information. The system may then transmit a notification to one or more devices based on detecting the child within the vehicle.

17 Claims, 9 Drawing Sheets

(56) References Cited

U.S. PATENT DOCUMENTS

| | | | | |
|---|---|---|---|---|
| 2023/0245452 | A1* | 8/2023 | Tan | G06V 20/44 348/143 |
| 2024/0175983 | A1* | 5/2024 | Zhu | G01S 13/86 |
| 2024/0187065 | A1* | 6/2024 | Hu | H04W 74/0808 |
| 2025/0138176 | A1* | 5/2025 | Jayaweera | G01S 13/003 |

OTHER PUBLICATIONS

Doshi, K., "Audio Deep Learning Made Simple (Part 1): State-of-the-Art Techniques", Medium, available online at: <https://towardsdatascience.com/audio-deep-learning-made-simple-part-1-state-of-the-art-techniques-da1d3dff2504>, Feb. 12, 2021, (21 pages).

Du, R., et al., "An Overview on IEEE 802.11bf: WLAN Sensing", arXiv:2207.04859, Jul. 11, 2022, (23 pages).

Infineon, "In-Cabin Monitoring System (ICMS)", available online at: <https://www.infineon.com/cms/en/applications/automotive/chassis-safety-and-adas/in-cabin-sensing/>, retrieved on Jul. 23, 2024, (6 pages).

Kuchar, P., et al., "Passenger Occupancy Estimation in Vehicles: A Review of Current Methods and Research Challenges", Sustainability, vol. 15, No. 2, Jan. 10, 2023, (27 pages).

Ma, Y., et al., "WiFi Sensing With Chanel State Information: A Survey", ACM Comput. Surv. vol. 52, No. 3, Article 46, Jun. 2019, (36 pages).

NHTSA, "Enhanced Safety of Vehicles", Research and Data, available online at :<https://www.nhtsa.gov/research-data/enhanced-safety-vehicles>, retrieved on Jul. 23, 2024, (2 pages).

NHTSA, "Stop. Look. Lock", Prevent Hot Car Deaths, available online at: <https://www.nhtsa.gov/campaign/heatstroke>, retrieved on Jul. 23, 2024, (4 pages).

PR Newswire, "Toyota Connected 'Cabin Awareness' Concept Uses New Tech to Detect Occupants", available online at: <https://www.prnewswire.com/news-releases/toyota-connected-cabin-awareness-concept-uses-new-tech-to-detect-occupants-301557450.html>, May 31, 2022, (7 pages).

Xi,W., et al., "Electronic frog eye: Counting crowd using WiFi", IEEE Infocom 2014—IEEE Conference on Computer Communications, Jul. 8, 2014, pp. 361-369.

Zeng, X., et al., "WiCPD: Wireless Child Presence Detection System for Smart Cars", IEEE Internet of Things Journal, vol. 9, No. 24, Dec. 15, 2022, pp. 24866-24881.

* cited by examiner

600

MULTIMODAL SYSTEM FOR HUMAN DETECTION AND ACTIVITY TRANSMISSION IN VEHICLES

BACKGROUND

The present disclosure relates to the detection of humans and animals in a vehicle and in particular to techniques for detecting a child or pet locked in a vehicle and informing one or more people of the child or pet locked in the vehicle.

SUMMARY

When a child is accidently locked in a vehicle, the child may suffer from hyperthermia, hypothermia, or even death. Many countries have regulations requiring newly manufactured vehicles to include a child presence detection (CPD) system to reduce fatalities. Some manufacturers utilize pressure sensors attached to a vehicle's seat to try and detect the presence of a child. However, pressure sensors often result in false positives because pressure sensors are unable to distinguish between a child and an inanimate object (e.g., backpack). Additionally, pressure sensors only monitor a small portion (e.g., the seat) of the vehicle and are unable to detect a child outside of the monitored portion (e.g., on the floor) of the vehicle. Some manufacturers have attempted to use passive infrared (PIR) sensors to detect the presence of a child. However, PIR sensors experience degraded performance when operating in environments with high temperatures and vehicles often experience high (e.g., inside a vehicle on a hot day). Some manufacturers use image sensors to detect the presence of a child. However, image sensors require significant power to operate effectively and struggle with obstructions. For example, if a blanket is covering a child, then a CPD system using image sensors may be unable to identify the child under the blanket.

Detecting the child in the vehicle is only the first step of a CPD system. After the CPD system detects a child in a vehicle, then the CPD system must notify the user and/or emergency services. Traditionally, CPD systems notify the user and/or emergency services using a wide area communication network or a point-to-point radio frequency (RF) link between the vehicle and a key fob associated with the vehicle. For example, once the CPD system detects a child in the vehicle, the CPD system may send a notification to the owner of the vehicle and/or emergency services using wide area communication protocols. However, wide area communications often require a subscription resulting in additional expenses for a user. In another example, once the CPD system detects a child in the vehicle, the CPD system may send a notification to the owner using the key fob associated with the vehicle. However, sending a notification using a point-to-point RF link between the vehicle and the key fob requires that the key fob be within the vicinity (e.g., 30 feet) of the vehicle. Accordingly, when the key fob is out of range of the vehicle, then the CPD system is unable to notify the user that the child is locked in the vehicle. In view of these deficiencies, there exists a need for improved low power systems and methods for accurately detecting a child in a vehicle and then notifying the user and/or emergency services about the child in the vehicle.

Accordingly, techniques are disclosed herein for detecting a child in a vehicle and then notifying a user and/or emergency service about the detected child. For example, a vehicle may comprise one or more Wi-Fi communication transceivers and one or more audio sensors. In some embodiments, the Wi-Fi communication transceivers are equipped with hardware and/or software to perform RF sensing and/or activity detection. The vehicle may use the sensors to detect a child in the vehicle. For example, the one or more Wi-Fi communication transceivers may collect channel state information (CSI) and a convolutional neural network (CNN) may process the collected CSI. The CNN may detect a child in the vehicle based on the processed CSI. For example, the CNN may use autocorrelation of CSI signals, filtered sub-carriers, and/or angle of arrival changes to detect the child in the vehicle. The one or more audio sensors may collect one or more audio waves and then spectral components may be generated by applying a Fourier transform to the one or more audio waves. A CNN may process the spectral components and detect the child in the vehicle. In some embodiments, the CNN used to process the CNN is different than the CNN used to process the spectral components. In some embodiments, the same CNN that processes the CSI also processes the spectral components.

If the vehicle determines that the processed CSI and processed spectral components indicate that a child is in the vehicle, then the vehicle may notify a user of the vehicle, an E911 forwarder, and/or emergency services. Using both the Wi-Fi communication transceivers and the audio sensors allows the vehicle to deploy a highly accurate, low-cost, and low-power consumption CPD system. Although embodiments of detecting a child are described, the same or similar methods may be used to detect and notify the user and/or emergency services of a pet and/or intruder.

Once the vehicle detects a child in the vehicle, the vehicle transmits a notification to the user of the vehicle and/or emergency services. The vehicle may use one or more communication systems (e.g., Bluetooth or Wi-Fi) to notify the user of the vehicle and/or emergency services. For example, the vehicle may use a communication system to search for a publisher of a communication forwarding service that can accept connections from a subscriber. The publisher (e.g., application on a smart phone, operating system of a smart phone, etc.) may be part of third-party device (e.g., a smartphone of a person walking past the vehicle). The publisher may accept the connection from the vehicle and accept information about the notification. The publisher may then transmit the information about the notification and/or the notification to the user (e.g., via the cloud) and/or to an emergency service system. In some embodiments, the vehicle transmits the notification using the one or more of the Wi-Fi communication transceivers used to collect the CSI. Using the described notification systems allows the vehicle to deploy a low-power and low-cost communication methodology.

In some embodiments, the vehicle also takes one or more actions to assist the detected child. For example, in response to detecting the child, the vehicle may unlock one or more of the vehicle's doors to assist one or more users and/or emergency personal with rescuing the child. In another example, in response to detecting the child, the vehicle may lower one or more of the vehicle's windows to cool down the car until one or more users and/or emergency personal arrive. In another example, in response to detecting the child, the vehicle may turn on the air conditioning (e.g., in hot environments) or turn on the heater (e.g., in cold environments) to make the interior of the vehicle more hospitable until one or more users and/or emergency personal arrive. In another example, in response to detecting the child, the vehicle may open the trunk of the vehicle to assist one or more users and/or emergency personal with rescuing the child.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1:
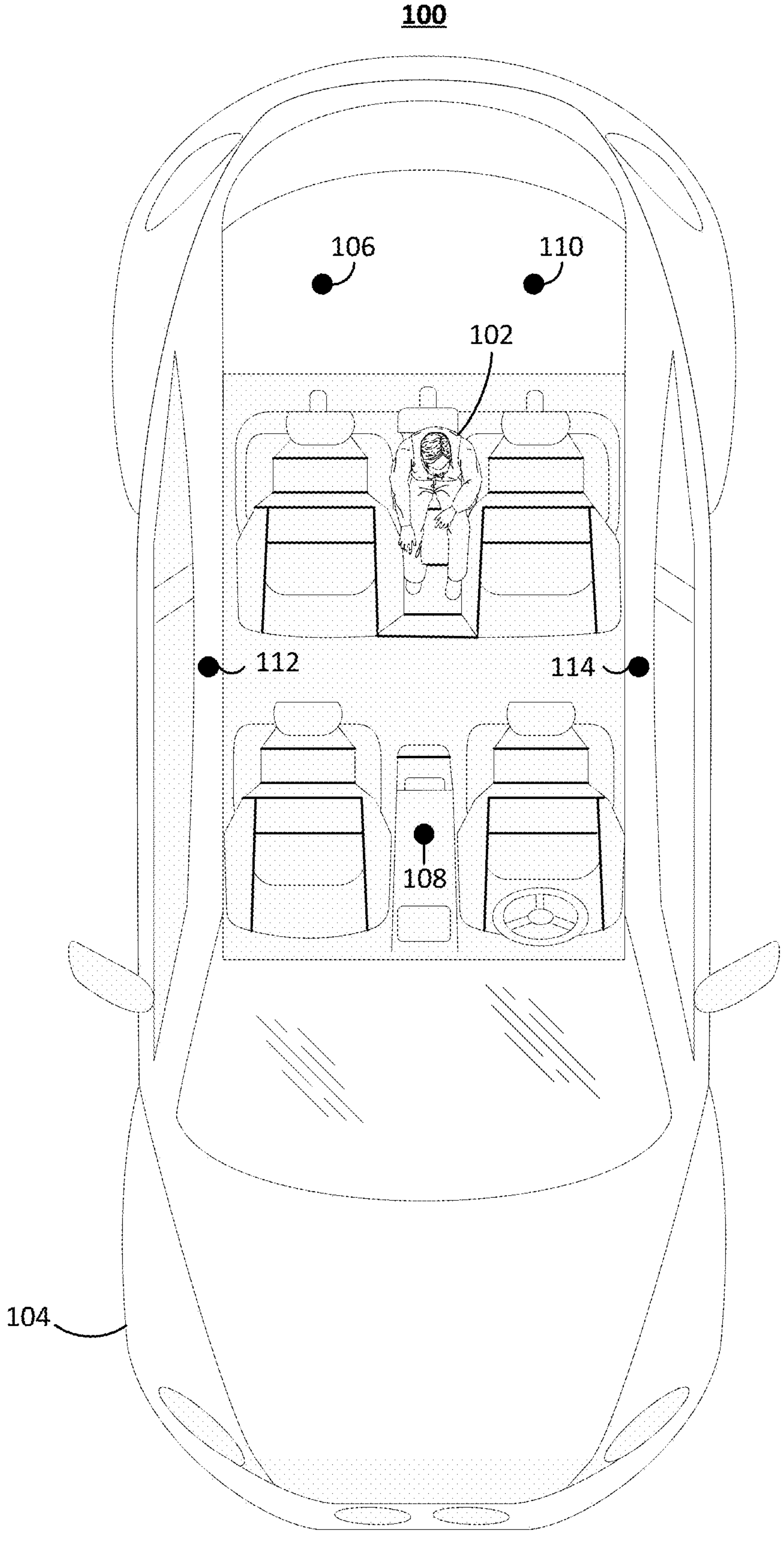
FIG. 1 shows an illustrative diagram of a system for detecting a child in a vehicle and then notifying a user and/or emergency service about the detected child, in accordance with some embodiments of the disclosure.

FIG. 1 shows an illustrative diagram of a system 100 for detecting a child 102 in a vehicle 104 and then notifying a user and/or emergency service about the detected child, in accordance with some embodiments of the disclosure. In some embodiments, the vehicle 104 comprises one or more Wi-Fi transceivers. For example, the vehicle 104 may comprise a first Wi-Fi transceiver 106, a second Wi-Fi transceiver 108, and a third Wi-Fi transceiver 110. The vehicle 104 may also comprise one or more audio sensors. For example, the vehicle 104 may comprise a first audio sensor 112 and a second audio sensor 114. In some embodiments, each audio sensor is the same type of audio sensor. In some embodiments, one or more audio sensors may be a different type of audio sensor.

Although Wi-Fi transceivers are described, other devices may be utilized. For example, Wi-Fi transmitters and/or Wi-Fi receivers may be utilized. Although devices using Wi-Fi protocols are described herein, similar such protocols (e.g., Bluetooth, Zigbee, etc.) may be used. In some embodiments, one or more Wi-Fi transceivers (e.g., first Wi-Fi transceiver 106) is in wireless communication with one or more other Wi-Fi transceivers (e.g., the second Wi-Fi transceiver 108). The wireless communication may be conducted via radio frequency, infrared, microwave, or other types of wireless communication and may be provided as two-way communication between the components of the one or more Wi-Fi transceivers. In some embodiments, one or more Wi-Fi transceivers (e.g., first Wi-Fi transceiver 106) and one or more other Wi-Fi transceivers (e.g., the second Wi-Fi transceiver 108) may also communicate bidirectionally using a wired or wireless connection via a control circuit (e.g., control circuitry 504) to which they both may be connected. In some embodiments, one or more Wi-Fi transceivers (e.g., first Wi-Fi transceiver 106) and one or more other Wi-Fi transceivers (e.g., the second Wi-Fi transceiver 108) may comprise their own control circuitry, including chips, and may comprise one or more antennas.

In some embodiments, CSI is processed to detect the child 102 in the vehicle 104. For example, the one or more Wi-Fi transceivers may generate signals that result in an observed set of relationships between known characteristics of transmitted signals (e.g., transmitted by one or more Wi-Fi transmitters (e.g., the first Wi-Fi transceiver 106)) and observed characteristics of received signals (e.g., the signal received by one or more Wi-Fi receivers (e.g., the second Wi-Fi transceiver 108)). The vehicle 104 may determine CSI indicating these relationships by analyzing transmitted signals and corresponding received signals. In some embodiments, the CSI may be embodied or indicated in a CSI matrix. The child 102 may be detected using the observed set of relationships (e.g., quantified or represented by the CSI or CSI matrix) as an input to a machine learning algorithm (e.g., a CNN).

In some embodiments, the machine learning algorithm is trained by transmitting multiple transmission signals, observing multiple received signals, and identifying multiple corresponding CSI sets or CSI matrices. Signal relationships related to the detection of a child 102 in a vehicle 104 may be generated by feeding each of these multiple CSI sets or CSI matrices to a machine learning algorithm, enabling it to better identify signal relationships related to the detection of a child 102 in a vehicle 104. In some embodiments, training data is used to train one or more machine learning algorithms.

In some embodiments, training data may comprise different CSI sets associated with different indicators. For example, a first CSI set may be collected while a vehicle (e.g., vehicle 104) is empty and a second CSI set may be collected while a child is located within the vehicle at a known position. The first CSI set may be associated with a first indictor indicating that no object is located in the vehicle and the second CSI set may be associated with a second indictor indicating that a child is located within the vehicle at the known position. The machine learning algorithm may be trained using the first CSI set, second CSI set, first indicator, and second indicator to better determine signal relationships related to the detection of a child in the vehicle. Only two CSI sets and indicators are described for simplicity, but the training data may comprise many more CSI sets and/or indicators. For example, the training data may comprise a plurality of CSI sets collected when children and/or objects are located at a plurality of different positions within the vehicle.
In another example, a first CSI set may be collected while a vehicle (e.g., vehicle 104) is empty and a second CSI set may be collected while a child is located within the vehicle.

The first CSI set may be associated with a first indictor indicating that no object is located in the vehicle and the second CSI set may be associated with a second indictor indicating that a child is located within the vehicle (without specifying the child's location). The machine learning algorithm may be trained using the first CSI set, second CSI set, first indicator, and second indicator to better determine signal relationships related to the detection of a child in the vehicle. Although detection of a child 102 is described the system may be trained to detect any living (e.g., human, pet, etc.) or non-lining object.

In some embodiments, one or more Wi-Fi transceivers (e.g., first Wi-Fi transceiver 106) transmits signals based on one or more factors. One factor of the one or more factors may relate to a time frame. For example, the first Wi-Fi transceiver 106 may transmit a signal every 10 seconds, 1 minute, 20 minutes, and/or any other similar such time frame. In some embodiments, one or more signals transmitted according to the one or more factors are part of a burst of signals. For example, the transceiver may transmit a burst of signals every 10 seconds, 1 minute, 20 minutes, and/or any other similar such time frame. In some embodiments, the burst of signals corresponds to a plurality of signals needed to generate CSI. In some embodiments, the one or more Wi-Fi transceivers have a monitoring period (e.g., 10 seconds, 1 minute, 20 minutes) for a time frame. For example, the first Wi-Fi transceiver 106 may monitor for a 5-minute period every 10 minutes. Another factor of the one or more factors may relate to a detection by one or more audio sensors. For example, the first Wi-Fi transceiver 106 may transmit a signal in response to the first audio sensor 112 detecting a sound. Another factor of the one or more factors may relate to a detection of a vehicle change (e.g., car opening, engine shutting off, seat reclining, pressure sensor activating, and/similar such vehicle changes).

Although single factors are described, any combination of factors may be used. For example, a first factor may indicate that the one or more Wi-Fi transceivers (e.g., first Wi-Fi transceiver 106) transmit/receive signals for the first 20 minutes after the engine of the vehicle 104 is shut off, and a second factor may indicate that the one or more Wi-Fi transceivers (e.g., first Wi-Fi transceiver 106) transmit/receive signals every 30 minutes. In such an example, the first Wi-Fi transceiver 106 and/or second Wi-Fi transceiver 108 may consistently transmit/receive signals during the first 20 minutes after the engine of the vehicle 104 is shut off, then only transmit/receive signals every 30 minutes. In some embodiments, when the one or more Wi-Fi transceivers are operating the one or more Wi-Fi transceivers transmit and/or receive a burst of CSI samples before powering off. In some embodiments, the one or more Wi-Fi transceivers (e.g., first Wi-Fi transceiver 106, second Wi-Fi transceiver 108) are powered off while not transmitting and/or receiving to decrease power consumption.

When a child 102 is located in the vehicle 104 and a signal is transmitted by the one or more Wi-Fi transceivers (e.g., first Wi-Fi transceiver 106), the signal is reflected off the child 102. While described as reflections, it will be understood that signals may also be refracted, diffracted, scattered and/or attenuated before reaching one or more other Wi-Fi transceivers (e.g., second Wi-Fi transceiver 108). The reflected signal(s) are received using one or more Wi-Fi transceivers and then the reflected signal(s) are used to generate CSI. In some embodiments, the generated CSI is then processed by a CNN as described herein. For example, the CNN may use autocorrelation of CSI signals, filtered sub-carriers, and/or angle of arrival changes to determine that the child 102 is in the vehicle 104. In some embodiments, similar such characteristics may be subsumed together in an embedding derived by training the machine learning model with calibration data (e.g., calibration data containing a plurality of examples of a child located within the vehicle 104).

In some embodiments, one or more audio sensors (e.g., first audio sensor 112) monitors for one or more audio waves based on one or more factors. One factor of the one or more factors may relate to a time frame. For example, the first audio sensor 112 may monitor for one or more audio waves every 10 seconds, 1 minute, 20 minutes, and/or any other similar such time frame. In some embodiments, the one or more audio sensors have a monitoring period (e.g., 10 seconds, 1 minute, 20 minutes) for a time frame. For example, the first audio sensor 112 may monitor for a 5-minute period every 10 minutes. Another factor of the one or more factors may relate to a detection by one or more Wi-Fi transceivers. For example, the first audio sensor 112 may start monitoring for one or more audio waves in response to the vehicle 104 determining that CSI collected by the second Wi-Fi transceiver 108 indicates that the child 102 is detected. Another factor of the one or more factors may relate to a detection of a vehicle change (e.g., car opening, engine shutting off, seat reclining, pressure sensor activating, and/similar such vehicle change).

Although single factors are described, any combination of factors may be used. For example, a first factor may indicate that the one or more audio sensors (e.g., first audio sensor 112) monitors for one or more audio waves for the first 20 minutes after the engine of the vehicle 104 is shut off, and a second factor may indicate that the one or more audio sensors (e.g., first audio sensor 112) monitors for one or more audio waves for a 5-minute period every 30 minutes. In such an example, the first audio sensor 112 may consistently monitor for audio waves during the first 20 minutes after the engine of the vehicle 104 is shut off, then only monitor for audio waves for 5-minute periods every 30 minutes. In some embodiments, the one or more audio sensors (e.g., first audio sensor 112, second audio sensor 114) are powered off while not monitoring for audio waves to decrease power consumption.

In some embodiments, the one or more audio waves that are detected by the one or more audio sensors (e.g., first audio sensor 112) may be used by the vehicle 104 to generate spectral components. For example, the vehicle 104 may apply a Fourier transform to the one or more audio waves. The vehicle 104 may then use a CNN to process the spectral components and detect the child 102 in the vehicle 104. In some embodiments, the CNN used to process the spectral components is different, then the CNN used to process the signals received by the one or more Wi-Fi transceivers (e.g., first Wi-Fi transceiver 106). In some embodiments, the same CNN that processes the spectral components also processes the signals received by the one or more Wi-Fi transceivers (e.g., first Wi-Fi transceiver 106). If the vehicle 104 determines that the processed CSI and processed spectral components indicate that the child 102 is in the vehicle 104, then the vehicle 104 may notify a user of the vehicle 104 and/or emergency services. For example, the vehicle 104 may transmit a notification indicating that the child 102 is located inside the vehicle 104 to a user of the vehicle 104 and/or emergency services. Using both the one or more Wi-Fi transceivers (e.g., first Wi-Fi transceiver 106, second Wi-Fi transceiver 108, third Wi-Fi transceiver 110) and the one or more audio sensors (e.g., first audio sensor 112, second audio sensor 114) allows the vehicle 104 to deploy a highly accurate, low-cost, and low-power consumption CPD system.

In some embodiments, the vehicle 104 uses a fully connected neural network to combine the outputs from the one or more Wi-Fi transceivers (e.g., first Wi-Fi transceiver 106, second Wi-Fi transceiver 108, and/or third Wi-Fi transceiver 110) and the one or more audio sensors (e.g., first audio sensor 112, and/or second audio sensor 114). The fully connected neural network is trained to learn the weights that are required to minimize the error in detection of objects (e.g., child 102). In some embodiments, the one or more Wi-Fi transceivers (e.g., first Wi-Fi transceiver 106, second Wi-Fi transceiver 108, and/or third Wi-Fi transceiver 110) and the one or more audio sensors (e.g., first audio sensor 112 and/or second audio sensor 114) are given equal weight when training the neural network.

In some embodiments, one or more Wi-Fi transceivers (e.g., first Wi-Fi transceiver 106, second Wi-Fi transceiver 108, and/or third Wi-Fi transceiver 110) and/or one or more audio sensors (e.g., first audio sensor 112 and/or second audio sensor 114) are given different weights depending on detected activity. For example, if audio waves collected by the first audio sensor 112 indicate that the first audio sensor 112 is closer to the origin point of the sound (e.g., child 102) compared to the second audio sensor 114, then the neural network may assign a higher weight to the first audio sensor 112 compared to a weight assigned to the second audio sensor 114. Similarly, if the first Wi-Fi transceiver 106 captures larger changes in CSI compared to the second Wi-Fi transceivers 108, then the neural network may assign a higher weight to the first Wi-Fi transceiver 106 compared to a weight assigned to the second Wi-Fi transceiver 108. In some embodiments, assigning different weights depending on detected activity results in improved accuracy based, at least in part, on removing redundant sources and reducing the possibility of overfitting of the neural network.

In some embodiments, one or more Wi-Fi transceivers (e.g., first Wi-Fi transceiver 106, second Wi-Fi transceiver 108, and/or third Wi-Fi transceiver 110) and/or one or more audio sensors (e.g., first audio sensor 112 and/or second audio sensor 114) are associated with different zones and are assigned different weights depending on a zone associated with the detected activity. For example, the first Wi-Fi transceiver 106 and the third Wi-Fi transceiver 110 may be associated with a first zone and the second Wi-Fi transceiver 108 may be associated with a second zone. The neural network may use the CSI captured by the first Wi-Fi transceiver 106, second Wi-Fi transceiver 108, and/or the third Wi-Fi transceiver 110 to determine that an object (e.g., child 102) is located in the first zone. In some embodiments, the captured CSI undergoes an iterative prediction process (e.g., a Kalman filter), prior to processing by the neural network, to facilitate the detection of an object (e.g., child 102) in the first zone. If the neural network determines that the object (e.g., child 102) is located in the first zone, then the neural network assigns a higher weight to the one or more Wi-Fi transceivers (e.g., the first Wi-Fi transceiver 106 and/or the third Wi-Fi transceiver 110) associated with the first zone compared to a weight assigned to one or more Wi-Fi transceivers (e.g., second Wi-Fi transceiver 108) associated with the second zone.

In another example, the first audio sensor 112 may be associated with a first zone and the second audio sensor 114 may be associated with a second zone. The neural network may use the audio waves captured by the first audio sensor 112 and/or the second audio sensor 114 to determine that an object (e.g., child 102) is located in the first zone. If the neural network determines that the object (e.g., child 102) is located in the first zone, then the neural network assigns a higher weight to the one or more audio sensors (e.g., first audio sensor 112) associated with the first zone compared to a weight assigned to one or more audio sensors (e.g., second audio sensor 114) associated with the second zone. In some embodiments, weighting one or more Wi-Fi transceivers (e.g., first Wi-Fi transceiver 106, second Wi-Fi transceiver 108 and/or third Wi-Fi transceiver 110) and/or one or more audio sensors (e.g., first audio sensor 112 and/or second audio sensor 114) based on the zone associated with the detected activity results in more accurate results in a loud environment. For example, noise from traffic outside the vehicle 104, noise from people yelling outside the vehicle 104, and/or similar such noise can result in false positives in detection methods that do not weigh one or more Wi-Fi transceivers (e.g., first Wi-Fi transceiver 106, second Wi-Fi transceiver 108 and/or third Wi-Fi transceiver 110) and/or one or more audio sensors (e.g., first audio sensor 112 and/or second audio sensor 114) based on the zone associated with the detected activity.

In some embodiments, the vehicle 104 also takes one or more actions to assist the detected child 102. For example, in response to detecting the child 102, the vehicle 104 may unlock one or more doors of the vehicle 104 to assist one or more users and/or emergency personal with rescuing the child 104. In another example, in response to detecting the child 102, the vehicle 104 may lower one or more windows of the vehicle 104 to cool down the vehicle 104 until one or more users and/or emergency personal arrive. In another example, in response to detecting the child 102, the vehicle 104 may turn on the air conditioning (e.g., in hot environments) or turn on the heater (e.g., in cold environments) to make the interior of the vehicle 104 more hospitable until one or more users and/or emergency personal arrive. In another example, in response to detecting the child 102, the vehicle 104 may open the trunk of the vehicle 104 to assist one or more users and/or emergency personal with rescuing the child 102.

In some embodiments, one or more Wi-Fi devices are located at different positions within the vehicle 104 based on the device type. For example, one or more Wi-Fi transmitters may be located at the front of the vehicle 104 while one or more Wi-Fi receivers may be located in the back of the vehicle 104. In another example, one or more Wi-Fi transmitters may be located at the center of the vehicle 104 (e.g., embedded in the roof of the vehicle 104) while one or more Wi-Fi receivers may be located along the perimeter of the interior (e.g., embedded within the side panels) of the vehicle 104.

Figure 2:
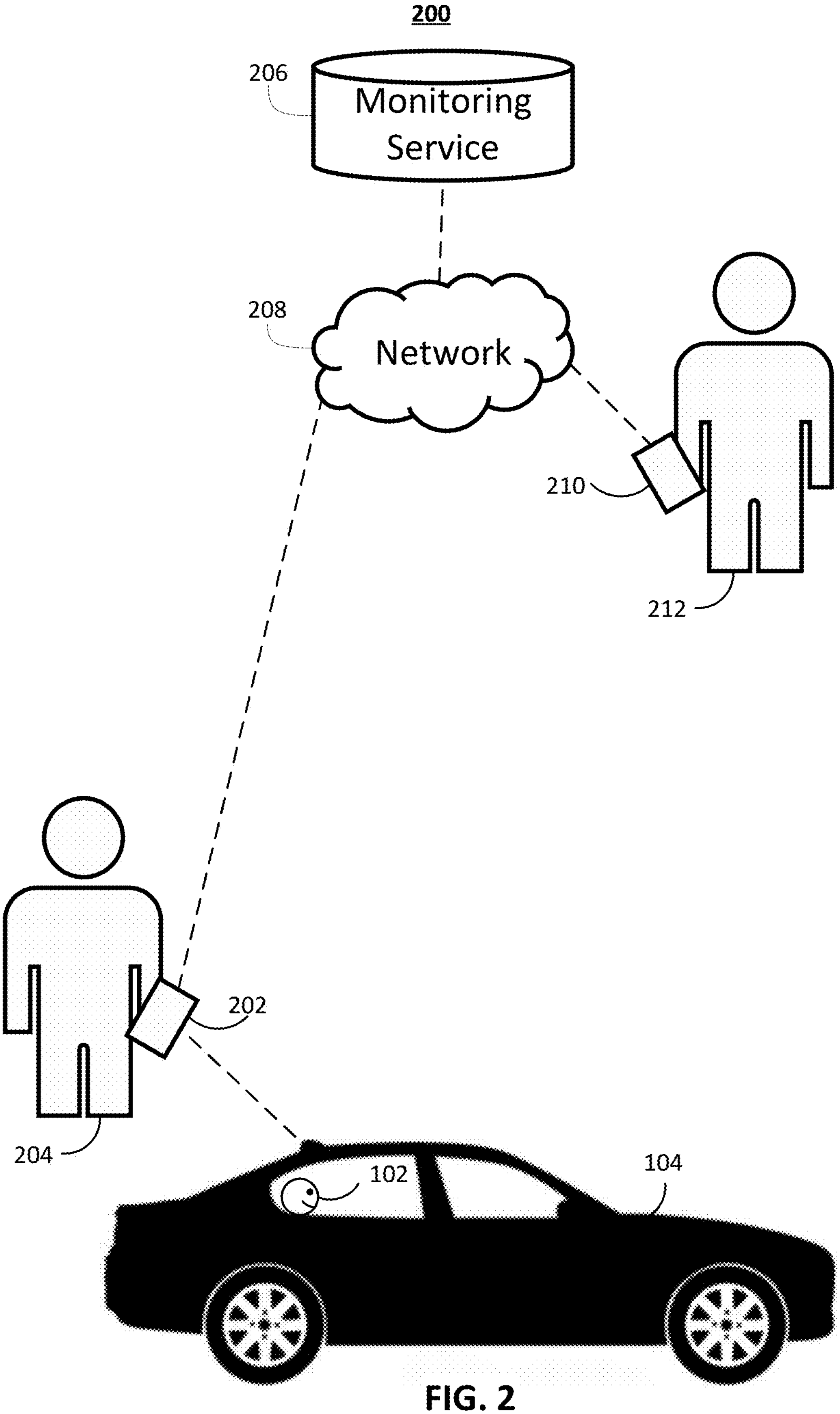
FIG. 2 shows another illustrative diagram for detecting a child in a vehicle and then notifying a user and/or emergency service about the detected child, in accordance with some embodiments of the disclosure.

FIG. 2 shows another illustrative diagram of a system 200 for detecting a child 102 in a vehicle 104 and then notifying a user and/or emergency service about the detected child, in accordance with some embodiments of the disclosure. In some embodiments, the child 102 and vehicle 104 shown in FIG. 2 are the same or similar to the child 102 and vehicle 104 described in FIG. 1. In some embodiments, the vehicle 104 detects the child 102 inside the vehicle 104 using the same or similar methods described above and transmits a notification based on detecting the child 102 inside the vehicle 104.

In some embodiments, the notification comprises data related to the vehicle 104, the detected object (e.g., child 102), and/or similar such information. For example, the data may indicate the temperature inside the vehicle 104, the location of the vehicle 104, and/or identifying information (e.g., make, model, license plate, etc.) about the vehicle 104. The data may also indicate whether a child, pet, or intruder is detected in the vehicle 104. The data may also indicate how long the detected object (e.g., child 102) has been located inside the vehicle 104. In some embodiments, the data comprises a picture of the detected object (e.g., child 102) and/or a picture of the area where the object (e.g., child 102) was detected. For example, the vehicle 104 may comprise a video monitoring system that is configured to capture pictures and/or videos of detected objects (e.g., child 102) and/or areas associated with detected objects (e.g., child 102).

In some embodiments, the vehicle 104 comprises a GPS system that determines the location of the vehicle 104. The data of the notification may indicate the location of the vehicle 104 determined by the GPS system. In some embodiments, E911 services require location information within a certain accuracy (e.g., 50 m-300 m). Accordingly, the location of the vehicle 104 determined by the GPS system of the vehicle 104 is included in the notification rather than a location of a mobile device that forwards that notification, because the mobile device may be further from the vehicle (e.g., further than 300 m) than what is required by E911 services.

The vehicle 104 may use one or more communication systems (e.g., Bluetooth or Wi-Fi) to transmit a first notification. For example, the vehicle 104 may use Wi-Fi to search for a publisher that can accept connections from a subscriber. The publisher (e.g., application on a smart phone, operating system of a smart phone, etc.) may be part of a first device 202. In some embodiments, the vehicle 104 uses the one or more communication systems to detect the first device 202 within a threshold of the vehicle 104. For example, a first user 204 carrying the first device 202 may enter into the threshold of the vehicle as the first user 204 walks past the vehicle 104. In some embodiments, the vehicle 104 transmits the first notification to the first device 202 once the first device 202 accepts the connection from the vehicle 104. In some embodiments, the vehicle 104 transmits the first notification to the first device 202 using one or more of the Wi-Fi transceivers (e.g., first Wi-Fi transceiver 106, second Wi-Fi transceiver 108 and/or third Wi-Fi transceiver 110) used to collect the CSI.

In some embodiments, the first device 202 transmits information about the first notification and/or the first notification to a monitoring service 206 (e.g., cloud monitoring service, emergency service, etc.) via one or more networks 208. For example, the first device 202 may transmit the information about the first notification and/or the first notification to the monitoring service 206 using a cellular network (e.g., 5G, LTE, etc.) and/or Wi-Fi connection. In some embodiments, the monitoring service 206 transmits one or more notifications based on receiving the information about the first notification and/or the first notification from the first device 202. For example, the monitoring service 206 may transmit a second notification to a second device 210 associated with a second user 212. In some embodiments, the second user 212 is the owner of the vehicle 104. In another example, the monitoring service 206 may transmit the second notification to one or more devices associated with emergency services (e.g., firefighters, police, ambulance, etc.). In some embodiments, the monitoring service 206 transmits one or more notifications to the second device 210 associated with the second user 212 and one or more notifications to emergency services.

In some embodiments, the monitoring service 206 transmits different notifications based on data contained in the received information about the first notification and/or the first notification. For example, if the data indicates that a child (e.g., the child 102) is in the vehicle 104, then the monitoring service 206 may transmit a notification indicating that a child is located in the vehicle 104. In another example, if the data indicates that an animal is in the vehicle 104, then the monitoring service 206 may transmit a notification indicating that an animal is located in the vehicle 104. In another example, if the data indicates that a child (e.g., the child 102) is in the vehicle 104, then the monitoring service 206 may transmit an "amber alert" style notification to one or more devices (e.g., first device 202) within a threshold of the vehicle 104.

In some embodiments, the monitoring service 206 transmits notifications to different devices based on data contained in the received information about the first notification and/or the first notification. For example, if the data indicates that a child (e.g., the child 102) is in the vehicle 104, then the monitoring service 206 may transmit a first notification indicating that a child is located in the vehicle 104 to the second device 210 associated with the second user 212, a second notification indicating that a child is located in the vehicle 104 to a third device associated with an ambulance service, and a third notification indicating that a child is located in the vehicle 104 to the first device 202. In another example, if the data indicates that an intruder is located in the vehicle 104, then the monitoring service 206 may transmit a first notification indicating that an intruder is located in the vehicle 104 to the second device 210 associated with the second user 212 and a second notification indicating that an intruder is located in the vehicle 104 to a third device associated with a police service. In another example, if the data indicates that an animal is located in the vehicle 104, then the monitoring service 206 may transmit a notification indicating that an animal is located in the vehicle 104 to the second device 210 associated with the second user 212.

In some embodiments, the monitoring service 206 transmits additional notifications based on input and/or lack of input from one or more devices. For example, the monitoring service 206 may transmit a notification to the second device 210 associated with the second user 212 indicating that the child 102 is located in the vehicle 104. The monitoring service 206 may receive another notification from the vehicle 104 (e.g., via the first device 202) indicating that the child 102 is still located within the vehicle 104. In response to the notification indicating that the child 102 is still located within the vehicle 104, the monitoring service 206 may transmit additional notifications to additional devices (e.g., devices associated with emergency services). In another example, the monitoring service 206 may transmit a notification to the second device 210 associated with the second user 212 indicating that the child 102 is located in the vehicle 104. If no acknowledgment is received from the second device 210 within a time period (e.g., 1 minute, 5 minutes, 10 minutes), then the monitoring service 206 may transmit additional notifications to additional devices (e.g., devices associated with emergency services).

In some embodiments, the methodologies described herein may be considered a peer-to-peer extension of E911 services. For example, the first device 202 may be registered to participate in an emergency service. Accordingly, the first device 202 may be identified as a publisher for notifications (e.g., from the vehicle 102) related to the emergency service. In some embodiments, subscribers to the emergency service are IoT devices and receive authorization from a trusted agency. In some embodiments, the publisher limits the tonnage/payload of the data that it is willing to forward on behalf of the vehicle 102.

Figure 3:
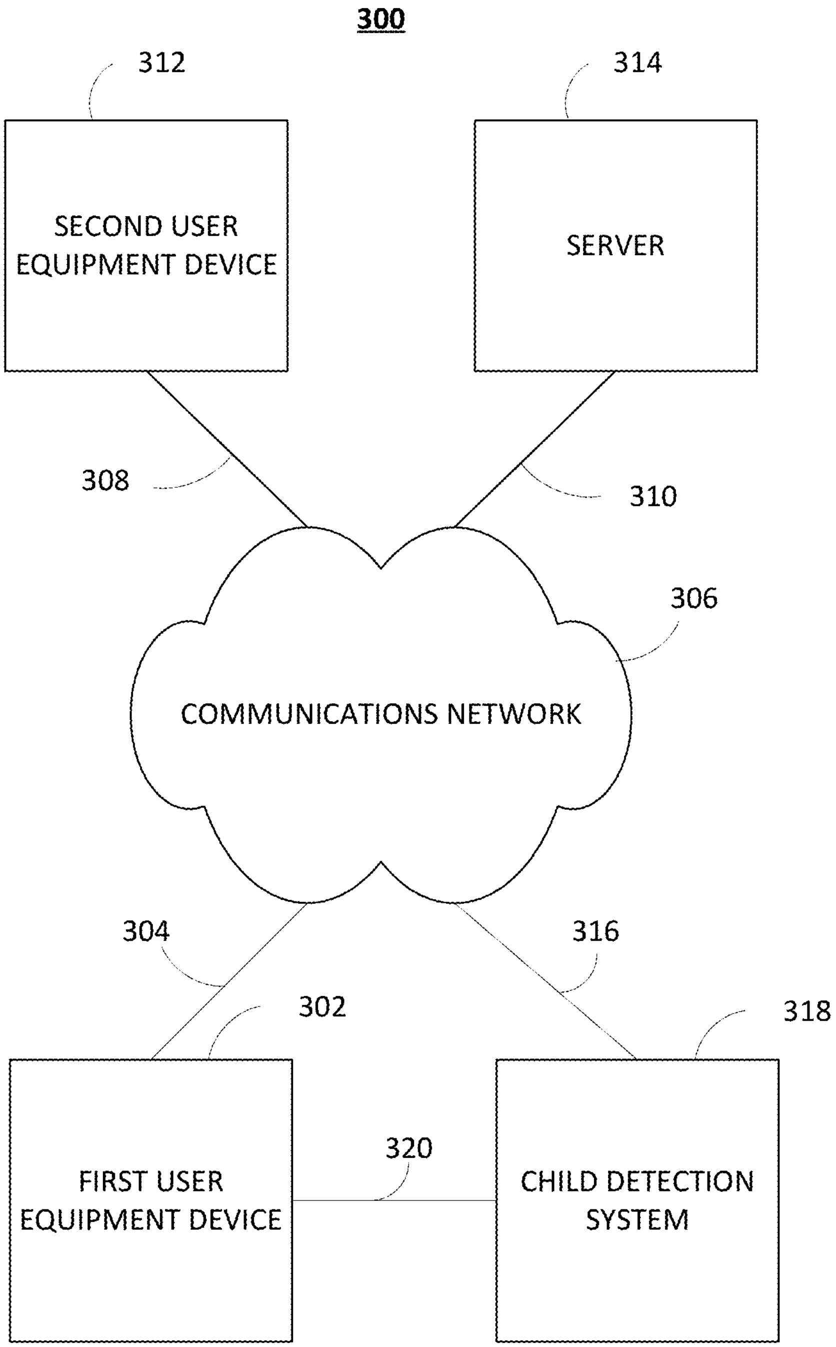
FIG. 3 shows an illustrative block diagram of a detection and communication system, in accordance with some embodiments of the disclosure.
Figure 4:
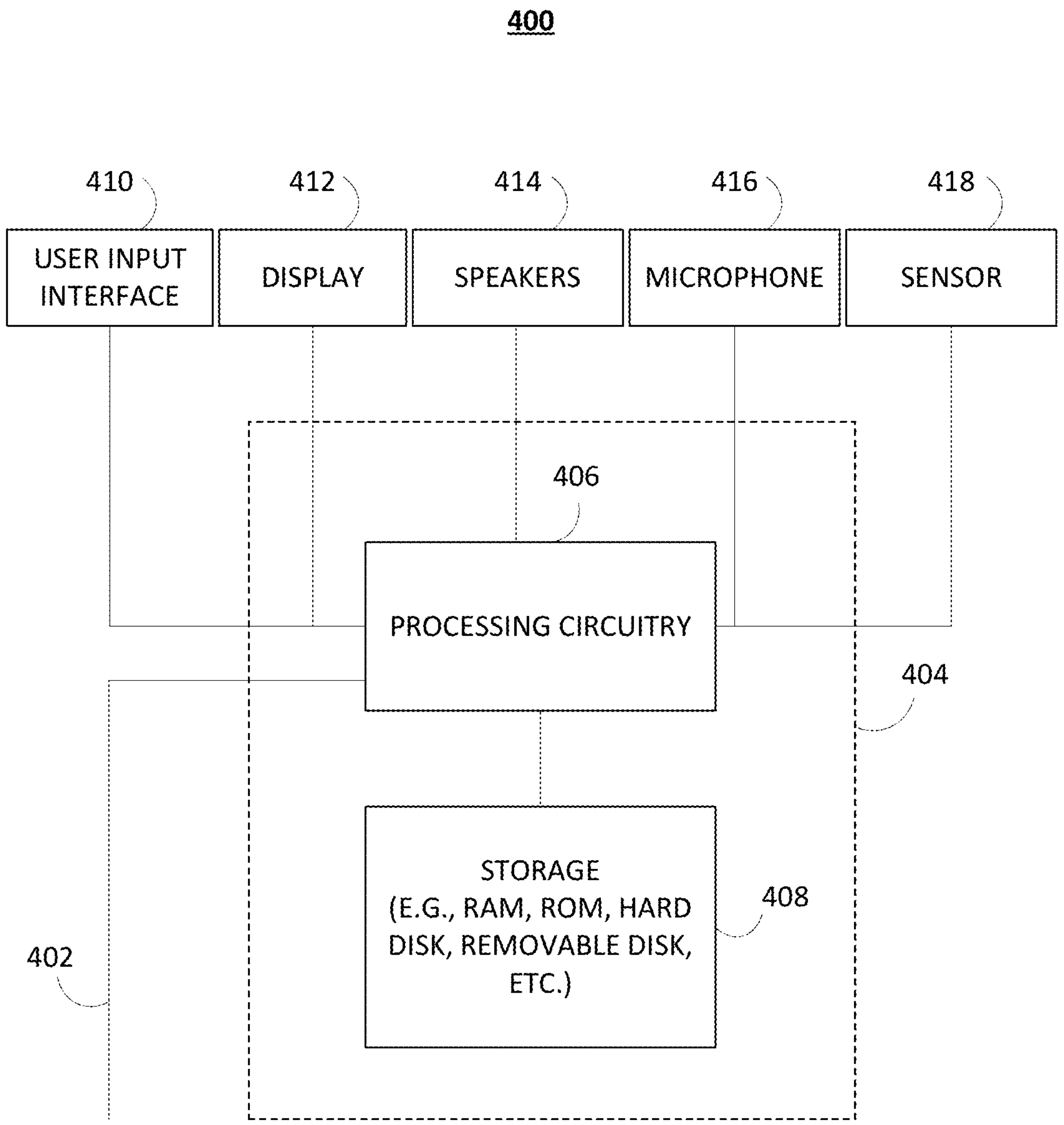
FIG. 4 shows an illustrative block diagram of a user equipment device system, in accordance with some embodiments of the disclosure.
Figure 5:
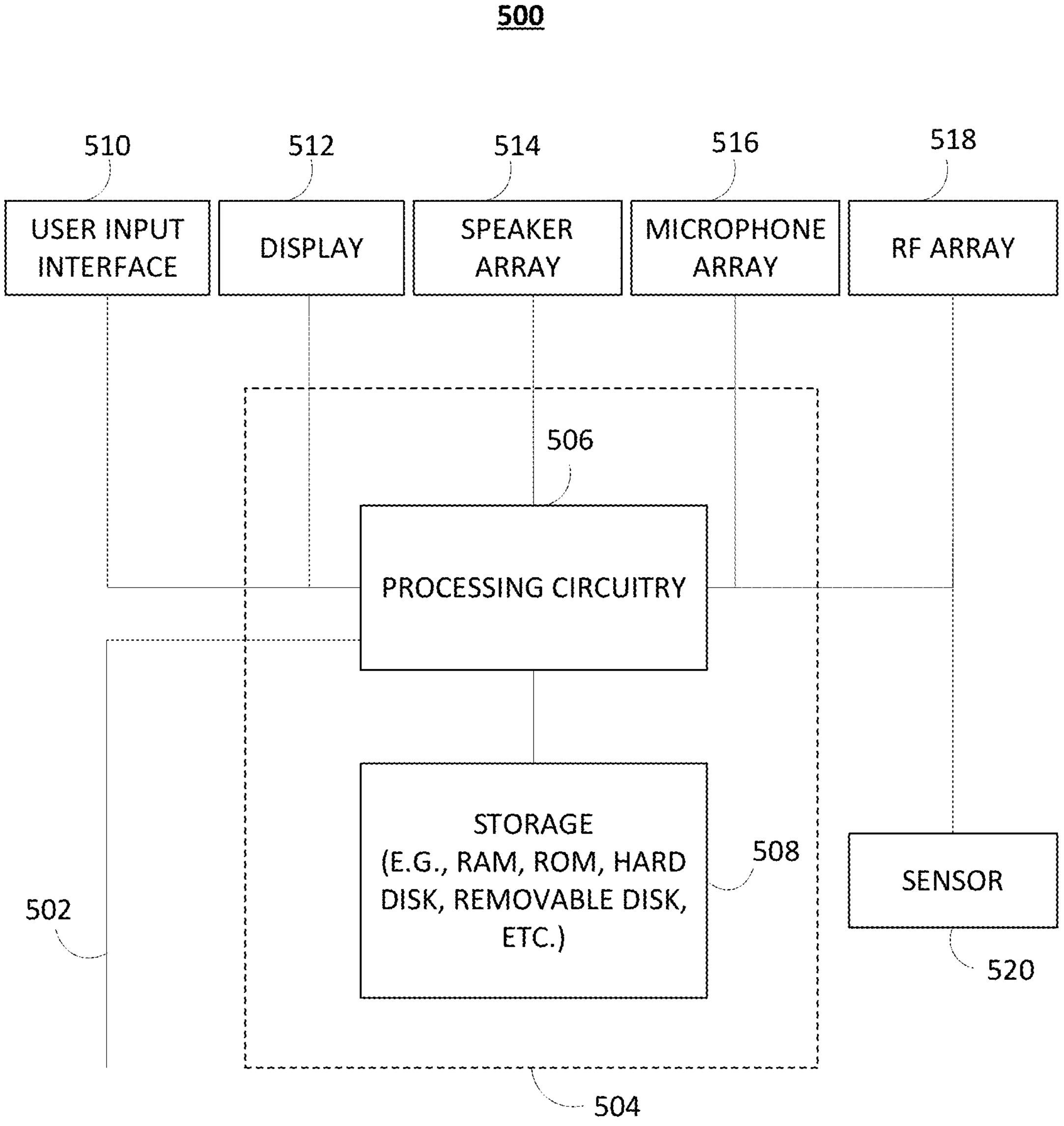
FIG. 5 shows an illustrative block diagram of a vehicle's child detection system, in accordance with some embodiments of the disclosure.

FIGS. 3-5 describe example devices, systems, servers, and related hardware for detecting a child in a vehicle and then notifying a user and/or emergency service about the detected child, in accordance with some embodiments of the disclosure. In the system 300, there is a first user equipment device 302 and a second user equipment device 312. In the system 300, there can be more than two user equipment devices, but only two are shown in FIG. 3 to avoid overcomplicating the drawing. In an embodiment, there may be paths between user equipment devices, so that the devices may communicate directly with each other via communications paths, as well as other short-range point-to-point communications paths, such as USB cables, IEEE 1394 cables, wireless paths (e.g., Bluetooth, infrared, IEEE 802-11x, etc.), or other short-range communication via wired or wireless paths. In an embodiment, the user equipment devices may also communicate with each other directly through an indirect path via the communications network 306.

The system 300 may also comprise more than one child detection system 318, but only one is shown in FIG. 3 to avoid overcomplicating the drawing. The user equipment devices and/or child detection system 318 may be coupled to communications network 306. Namely, the first user equipment device 302 is coupled to the communications network 306 via a first communication path 304, the second user equipment device 312 is coupled to the communications network 306 via a second communication path 308, and the child detection system 318 is coupled to the communications network 306 via a third communications path 316. The communications network 306 may be one or more networks including the Internet, a mobile phone network, mobile voice or data network (e.g., a 5G or LTE network), cable network, public switched telephone network, or other types of communications network or combinations of communications networks. The communications network 306 may connected to a server 314 through a fourth path 310. The paths may separately or in together with other paths include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. In some embodiments, the paths may be wireless paths.

Communications between the devices may be provided by one or more communications paths but is shown as a single path in FIG. 3 to avoid overcomplicating the drawing. In an embodiment, there may be one or more paths (e.g., fifth path 320) between the first user equipment device 302 and the child detection system 318, so that the devices may communicate directly with each other via communications paths, as well as other short-range point-to-point communications paths, such as USB cables, IEEE 1394 cables, wireless paths (e.g., UWB, Bluetooth, infrared, IEEE 802-11x, etc.), or other short-range communication via wired or wireless paths. In an embodiment, the first user equipment device 302 and the child detection system 318 may also communicate with each other directly through an indirect path via the communications network 306.

The server 314 can be coupled to any number of databases (e.g., media content database, user profile database, registration database, zone database, notification database, etc.) providing information to the user equipment devices and/or child detection systems. The server 314 may store and execute various software modules to implement the detecting of a child in a vehicle and then notifying a user and/or emergency service about the detected child functionality. In some embodiments, the server 314 is associated with one or more monitoring services.

FIG. 4 shows a generalized embodiment of a user equipment device 400, in accordance with some embodiments. In an embodiment, the user equipment device 400 is the same or similar to the first user equipment device 302 and/or the second user equipment device 312 of FIG. 3. The user equipment device 400 may receive content and data via input/output (I/O) path 402. The I/O path 402 may provide content (e.g., broadcast programming, on-demand programming, Internet content, content available over a local area network (LAN) or wide area network (WAN), and/or other content) and data to control circuitry 404, which includes processing circuitry 406 and a storage 408. The control circuitry 404 may be used to send and receive commands, requests, and other suitable data using the I/O path 402. The I/O path 402 may connect the control circuitry 404 (and specifically the processing circuitry 406) to one or more communications paths. I/O functions may be provided by one or more of these communications paths but are shown as a single path in FIG. 4 to avoid overcomplicating the drawing.

The control circuitry 404 may be based on any suitable processing circuitry such as the processing circuitry 406. As referred to herein, processing circuitry 406 should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). The child detection and communication functionality can be at least partially implemented using the control circuitry 404. The child detection and communication functionality described herein may be implemented in or supported by any suitable software, hardware, or combination thereof. The child detection and communication functionality can be implemented on the user equipment, on remote servers, or across both.

In client/server-based embodiments, the control circuitry 404 may include communications circuitry suitable for communicating with one or more servers and/or vehicle communication systems that may at least implement the described providing of child detection and communication functionality. The instructions for carrying out the above-mentioned functionality may be stored on one or more vehicle communication systems and/or one or more servers. Communications circuitry may include a cable modem, an integrated service digital network (ISDN) modem, a digital subscriber line (DSL) modem, a telephone modem, an Ethernet card, a radio (e.g., UWB radio), a wireless modem for communications with other equipment, and/or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device provided as the storage 408 that is part of the control circuitry 404. As referred to herein, the phrase “electronic storage device” or “storage device” should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called a personal video recorders, or PVRs), solid-state devices, quantum storage devices, gaming consoles, gaming media, or any other suitable fixed or removable storage devices, and/or any combination of the same. The storage 408 may also store any number of databases (e.g., media content database, user profile database, registration database, zone database, etc.). The storage 408 may be used to store various types of content described herein. Nonvolatile memory may also be used (e.g., to launch a boot-up routine and other instructions). Cloud-based storage may be used to supplement the storage 408 or instead of the storage 408.

The control circuitry 404 may include audio generating circuitry and tuning circuitry, such as one or more analog tuners, audio generation circuitry, filters or any other suitable tuning or audio circuits or combinations of such circuits. The control circuitry 404 may also include scaler circuitry for upconverting and down converting content into the preferred output format of the user equipment device 400. The control circuitry 404 may also include digital-to-analog converter circuitry and analog-to-digital converter circuitry for converting between digital and analog signals. The tuning and encoding circuitry may be used by the user equipment device 400 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 408 is provided as a separate device from the user equipment device 400, the tuning and encoding circuitry (including multiple tuners) may be associated with the storage 408.

The user may utter instructions to the control circuitry 404, which are received by the microphone 416. The microphone 416 may be any microphone (or microphones) capable of detecting human speech. The microphone 416 is connected to the processing circuitry 406 to transmit detected voice commands and other speech thereto for processing.

The user equipment device 400 may optionally include an interface 410. The interface 410 may be any suitable user interface, such as a remote control, mouse, trackball, keypad, keyboard, touchscreen, touchpad, stylus input, joystick, or other user input interfaces. A display 412 may be provided as a stand-alone device or integrated with other elements of the user equipment device 400. For example, the display 412 may be a touchscreen or touch-sensitive display. In such circumstances, the interface 410 may be integrated with or combined with the microphone 416. When the interface 410 is configured with a screen, such a screen may be one or more of a monitor, a television, a liquid crystal display (LCD) for a mobile device, active matrix display, cathode ray tube display, light-emitting diode display, organic light-emitting diode display, quantum dot display, or any other suitable equipment for displaying visual images. In some embodiments, the interface 410 may be HDTV-capable. In some embodiments, the display 412 may be a 3D display.

The speakers 414 may be integrated with other elements of user equipment device 400 or may be one or more stand-alone units. In some embodiments, the speakers 414 may be dynamic speakers, planar magnetic speakers, electrostatic speakers, horn speakers, subwoofers, tweeters, and/or similar such speakers. In some embodiments, the control circuitry 404 outputs one or more audio signals to the speakers 414.

FIG. 5 shows a generalized embodiment of a vehicle's child detection system 500, in accordance with some embodiments. In an embodiment, the child detection system 500 is the same the child detection system 318 of FIG. 3. The child detection system 500 may receive content and data via I/O path 502. The I/O path 502 may provide content (e.g., broadcast programming, on-demand programming, Internet content, content available over a LAN or WAN, and/or other content) and data to control circuitry 504, which includes processing circuitry 506 and a storage 508. The control circuitry 504 may be used to send and receive commands, requests, and other suitable data using the I/O path 502. The I/O path 502 may connect the control circuitry 504 (and specifically the processing circuitry 506) to one or more communications paths. I/O functions may be provided by one or more of these communications paths but are shown as a single path in FIG. 5 to avoid overcomplicating the drawing.

The control circuitry 504 may be based on any suitable processing circuitry such as the processing circuitry 506. As referred to herein, processing circuitry 506 should be understood to mean circuitry based on one or more microprocessors, microcontrollers, digital signal processors, programmable logic devices, FPGAs, ASICs, etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). The child detection and communication functionality can be at least partially implemented using the control circuitry 504. The child detection and communication functionality described herein may be implemented in or supported by any suitable software, hardware, or combination thereof. The child detection and communication functionality can be implemented on the vehicle's child detection system 500, user equipment, and/or on remote servers.

In client/server-based embodiments, the control circuitry 504 may include communications circuitry suitable for communicating with one or more user equipment devices and/or one or more servers that may at least implement the described child detection and communication functionality. The instructions for carrying out the above-mentioned functionality may be stored on one or more user equipment devices and/or one or more servers. Communications circuitry may include a cable modem, an ISDN modem, a DSL modem, a telephone modem, an Ethernet card, a radio (e.g., UWB radio), a wireless modem for communications with other equipment, and/or any other suitable communications circuitry. Such communications may involve the Internet or any other suitable communications networks or paths. In addition, communications circuitry may include circuitry that enables peer-to-peer communication of child detection systems.

Memory may be an electronic storage device provided as the storage 508 that is part of the control circuitry 504. The storage 508 may also store any number of databases (e.g., media content database, user profile database, registration database, zone database, etc.). The storage 508 may be used to store various types of data described herein. Nonvolatile memory may also be used (e.g., to launch a boot-up routine and other instructions). Cloud-based storage may be used to supplement the storage 508 or instead of the storage 508.

The control circuitry 504 may include audio generating circuitry and tuning circuitry, such as one or more analog tuners, audio generation circuitry, filters or any other suitable tuning or audio circuits or combinations of such circuits. The control circuitry 504 may also include scaler circuitry for upconverting and down converting content into the preferred output format of the child detection system 500. The control circuitry 504 may also include digital-to-analog converter circuitry and analog-to-digital converter circuitry for converting between digital and analog signals. The tuning and encoding circuitry may be used by the child detection system 500 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 508 is provided as a separate device from the child detection system 500, the tuning and encoding circuitry (including multiple tuners) may be associated with the storage 508.

The microphone array 516 may be integrated with other elements of the child detection system 500 or may be one or more stand-alone units. The microphone array 516 may comprise one or more microphones capable of detecting human speech and/or sounds related to a human or animal. The microphone array 516 is connected to the processing circuitry 506 to transmit detected audio thereto for processing. In some embodiments, the user may utter instructions to the control circuitry 504, which are received by one or more microphones of the microphone array 516.

The RF array 518 may be integrated with other elements of the child detection system 500 or may be one or more stand-alone units. The RF array 518 may comprise one or more RF transceivers, transmitters, and/or receivers capable of detecting one or more humans and/or one or more animals. The RF array 518 is connected to the processing circuitry 506 to transmit detected RF information thereto for processing. In some embodiments, one or more RF devices of the RF array 518 may be used to communicate with one or more devices via a short-range communication technology (e.g., Wi-Fi, Bluetooth, etc.).

The child detection system 500 may optionally include an interface 510. The interface 510 may be any suitable user interface, such as a remote control, mouse, trackball, keypad, keyboard, touchscreen, touchpad, stylus input, joystick, or other user input interfaces. A display 512 may be provided as a stand-alone device or integrated with other elements of the child detection system 500. For example, the display 512 may be a touchscreen or touch-sensitive display. In such circumstances, the interface 510 may be integrated with or combined with one or more microphones of the microphone array 516. When the interface 510 is configured with a screen, such a screen may be one or more of a monitor, a television, an LCD, active-matrix display, cathode ray tube display, light-emitting diode display, organic light-emitting diode display, quantum dot display, or any other suitable equipment for displaying visual images. In some embodiments, the interface 510 may be HDTV-capable. In some embodiments, the display 512 may be a 3D display.

The speaker array 514 may be integrated with other elements of the child detection system 500 or may be one or more stand-alone units. In some embodiments, the speaker array 514 may be dynamic speakers, planar magnetic speakers, electrostatic speakers, horn speakers, subwoofers, tweeters, and/or similar such speakers. In some embodiments, the control circuitry 504 outputs one or more audio signals to the speaker array 514. In some embodiments, one or more speakers of the speaker array 514 receive and output a unique audio signal. In some embodiments, one or more speakers of the speaker array 514 receive and output the same audio signal. In some embodiments, one or more speakers of the speaker array 514 can change positions and/or orientations.

The child detection system 500 may also comprise one or more sensors 520 in addition to the RF array 518. The sensor 520 may be one or more image (e.g., optical) sensors, depth sensors, ultra sonic sensors, Infrared (IR) cameras, Red Green Blue (RGB) cameras, Passive IR (PIR) cameras, heat IR sensors, tension sensors, pressure sensors, and/or any combination thereof.

Figure 6:
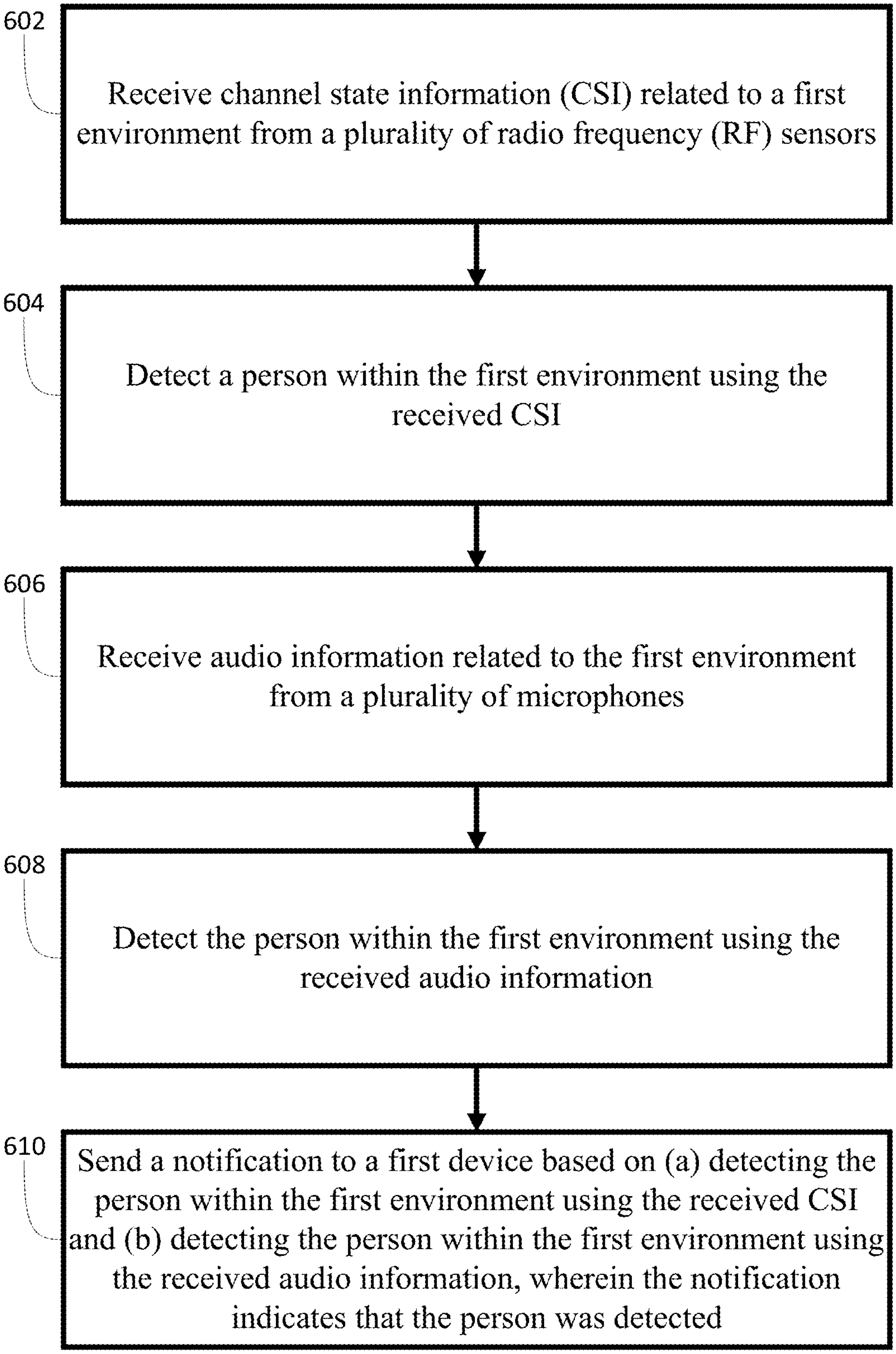
FIG. 6 is an illustrative flowchart of a process for detecting a child in a vehicle and then notifying a user and/or emergency service about the detected child, in accordance with some embodiments of the disclosure.

FIG. 6 is an illustrative flowchart of a process 600 for detecting a child in a vehicle and then notifying a user and/or emergency service about the detected child, in accordance with some embodiments of the disclosure. Process 600, and any of the following processes, may be executed by control circuitry 404 on a user equipment device 400 and/or by control circuitry 504 of the child detection system 500. In some embodiments, control circuitry may be part of a remote server separated from the user equipment device 400 and/or child detection system 500 by way of a communications network or distributed over a combination of both. In some embodiments, instructions for executing process 600 may be encoded onto a non-transitory storage medium (e.g., the storage 408, the storage 508) as a set of instructions to be decoded and executed by processing circuitry (e.g., the processing circuitry 406, the processing circuitry 506). Processing circuitry may, in turn, provide instructions to other sub-circuits contained within control circuitry, such as the encoding, decoding, encrypting, decrypting, scaling, analog/digital conversion circuitry, and the like. It should be noted that the following processes, or any step thereof, could be performed on, or provided by, any of the devices shown in FIGS. 1-5. Although the following processes are illustrated as described as a sequence of steps, it is contemplated that various embodiments of processes may be performed in any order or combination and need not include all the illustrated steps.

At 602, control circuitry receives CSI related to a first environment from a plurality of RF sensors. In some embodiments, the first environment corresponds to the inside of a vehicle and the vehicle comprises the plurality of RF sensors. In some embodiments, at least one of the plurality of RF sensors is a transmitter and at least one of the plurality of RF sensors is a receiver. In some embodiments, at least one of the plurality of RF sensors comprises both a transmitter and a receiver. The plurality of RF sensors may generate signals that result in an observed set of relationships between known characteristics of transmitted signals and observed characteristics of received signals. The control circuitry analyzes the transmitted signals and corresponding received signals to determine the CSI. In some embodiments, the CSI may be embodied or indicated in a CSI matrix.

At 604, control circuitry detects a person within the first environment using the received CSI. In some embodiments, the control circuitry processes the observed set of relationships (e.g., quantified or represented by the CSI or CSI matrix) using a machine learning algorithm (e.g., a CNN) to detect a person (e.g., child) in the first environment (e.g., vehicle).

At 606, control circuitry receives audio information related to the first environment from a plurality of microphones. In some embodiments, the first environment corresponds to the inside of a vehicle and the vehicle comprises the plurality of microphones. In some embodiments, the audio information corresponds to audio waves received from the plurality of microphones and/or the plurality of spectral components associated with the detected audio waves.

At 608, control circuitry detects the person within the first environment using the received audio information. In some embodiments, the control circuitry uses a CNN to process the audio information detected by the one or more microphones to detect the person (e.g., child) in the first environment (e.g., vehicle). In some embodiments, the CNN used to process the audio information in step 608 is different, then the CNN used to process the CSI in step 604. In some embodiments, the same CNN that processes the audio information in step 608 also processes the CSI in step 604.

At 610, control circuitry sends a notification to a first device based on (a) detecting the person within the first environment using the received CSI and (b) detecting the person within the first environment using the received audio information, wherein the notification indicates that the person was detected. In some embodiments, the notification comprises data related to the first environment, the detected person, and/or similar such information. For example, the data may indicate the temperature associated with the first environment, the location of the first environment, and/or identifying information associated with the first environment. The data may also indicate whether the detected person is a child or intruder. The data may also indicate how long the detected person has been located inside the first environment.

The control circuitry may use one or more communication systems (e.g., Bluetooth or Wi-Fi) to transmit the notification. For example, the control circuitry may use at least one of the plurality of RF sensors to transmit the notification to the first device. In some embodiments, the control circuitry uses the one or more communication systems to detect the first device within a threshold of the control circuitry. For example, a user carrying the first device may enter into the threshold of the control circuitry as the user walks past the control circuitry.

In some embodiments, the first device transmits information about the notification and/or the notification to a monitoring service (e.g., cloud monitoring service, emergency service, etc.) via one or more networks. For example, the first device may transmit the information about the notification and/or the notification to the monitoring service using a cellular network (e.g., 5G, LTE, etc.) and/or Wi-Fi connection. In some embodiments, the monitoring service transmits one or more other notifications based on receiving the information about the notification and/or the notification from the first device. For example, the monitoring service may transmit a second notification to a second device associated with a second user, wherein the second user is associated with the first environment (e.g., the owner of the vehicle). In another example, the monitoring service may transmit the second notification to one or more devices associated with emergency services (e.g., firefighters, police, ambulance, etc.).

Figure 7:
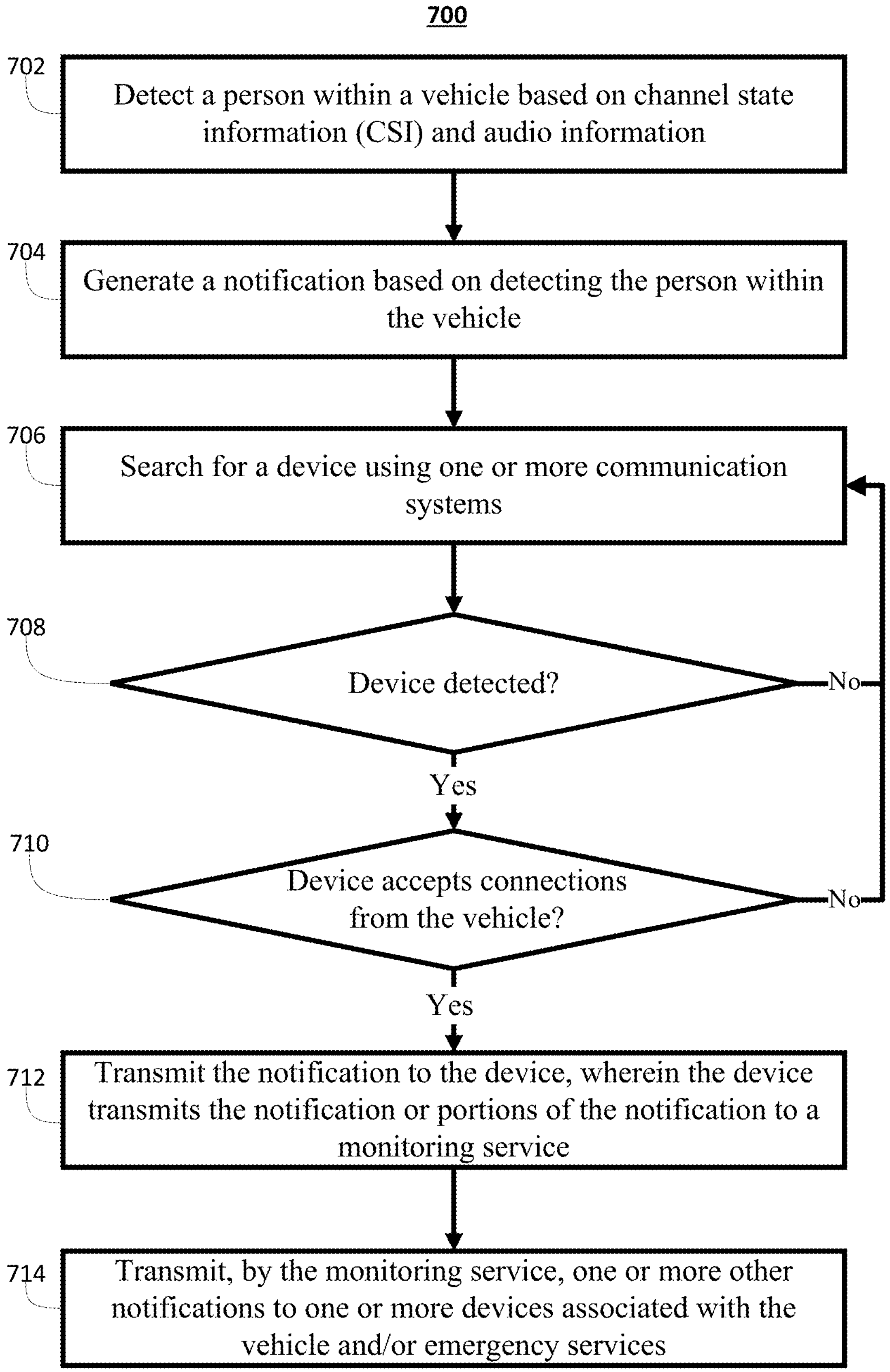
FIG. 7 is another illustrative flowchart of a process for detecting a child in a vehicle and then notifying a user and/or emergency service about the detected child, in accordance with some embodiments of the disclosure.

FIG. 7 is another illustrative flowchart of a process for detecting a child in a vehicle and then notifying a user and/or emergency service about the detected child, in accordance with some embodiments of the disclosure.

At 702, control circuitry detects a person within a vehicle based on CSI and audio information. In some embodiments, the control circuitry uses the same or similar methodologies described at steps 604 and 608 above to detect the person within the vehicle based on CSI and audio information.

At 704, control circuitry generates a notification based on detecting the person within the vehicle. In some embodiments, the notification comprises data related to the vehicle, the detected person, and/or similar such information. For example, the data may indicate the temperature associated with the vehicle, the location of the vehicle, and/or identifying information (e.g., make, model, license plate, etc.) about the vehicle. The data may also indicate whether the detected person is a child or intruder. The data may also indicate how long the detected person has been located inside the vehicle. In some embodiments, the notification is a broadcast message to any publisher of communication services.

At 706, control circuitry searches for a device using one or more communication systems. In some embodiments, the control circuitry uses the one or more communication systems (e.g., Bluetooth or Wi-Fi) to detect the device within a threshold of the control circuitry. For example, a user carrying the device may enter into the threshold of the control circuitry as the user walks past the control circuitry. In some embodiments, the control circuitry also uses the one or more communication systems to search for a publisher of communication forwarding services that can accept connections from a subscriber. The publisher (e.g., application on a smart phone, operating system of a smart phone, etc.) may be part of the device.

At 708, control circuitry determines whether a device is detected. In some embodiments, the control circuitry uses the one or more communication systems (e.g., Bluetooth or Wi-Fi) to detect the device within a threshold of the control circuitry. If the control circuitry determines that a device is detected, the process 700 continues to step 710. If the control circuitry determines that a device is not detected, the process 700 returns to step 706 where the control circuitry continues to search for a device using one or more communication systems.

At 710, control circuitry determines whether the device accepts connections from the vehicle. In some embodiments, the connection is an acknowledgment that the device will forward the notification. If the control circuitry determines that the device does accept connections from the vehicle, the process 700 continues to step 710. If the control circuitry determines that the device does not accept connections from the vehicle, the process 700 returns to step 706 where the control circuitry continues to search for another device using one or more communication systems.

At 712, control circuitry transmits the notification to the device, wherein the device transmits the notification or portions of the notification to a monitoring service. In some embodiments, the control circuitry transmits the notification to the device using one or more of the RF sensors used to collect the CSI of step 702.

In some embodiments, the device then transmits information about the notification and/or the notification to a monitoring service (e.g., cloud monitoring service, emergency service, etc.) via one or more networks. For example, the device may transmit the information about the notification and/or the notification to the monitoring service using a cellular network (e.g., 5G, LTE, etc.) and/or Wi-Fi connection. In some embodiments, the device transmits the notification to another device that is a publisher of communication services. In this manner, the notification may recursively reach the monitoring service.

At 714, the monitoring service transmits one or more other notification to one or more devices associated with the vehicle and/or emergency services. In some embodiments, the monitoring service transmits the one or more other notifications based on receiving the information about the notification and/or the notification from the device. For example, the monitoring service may transmit a second notification to a second device associated with a second user, wherein the second user is the owner of the vehicle. In another example, the monitoring service may transmit the second notification to one or more devices associated with emergency services (e.g., firefighters, police, ambulance, etc.). In some embodiments, the monitoring service transmits a second notification to a second device associated with the user of the vehicle and a third notification to one or more devices associated with emergency services.

Figure 8:
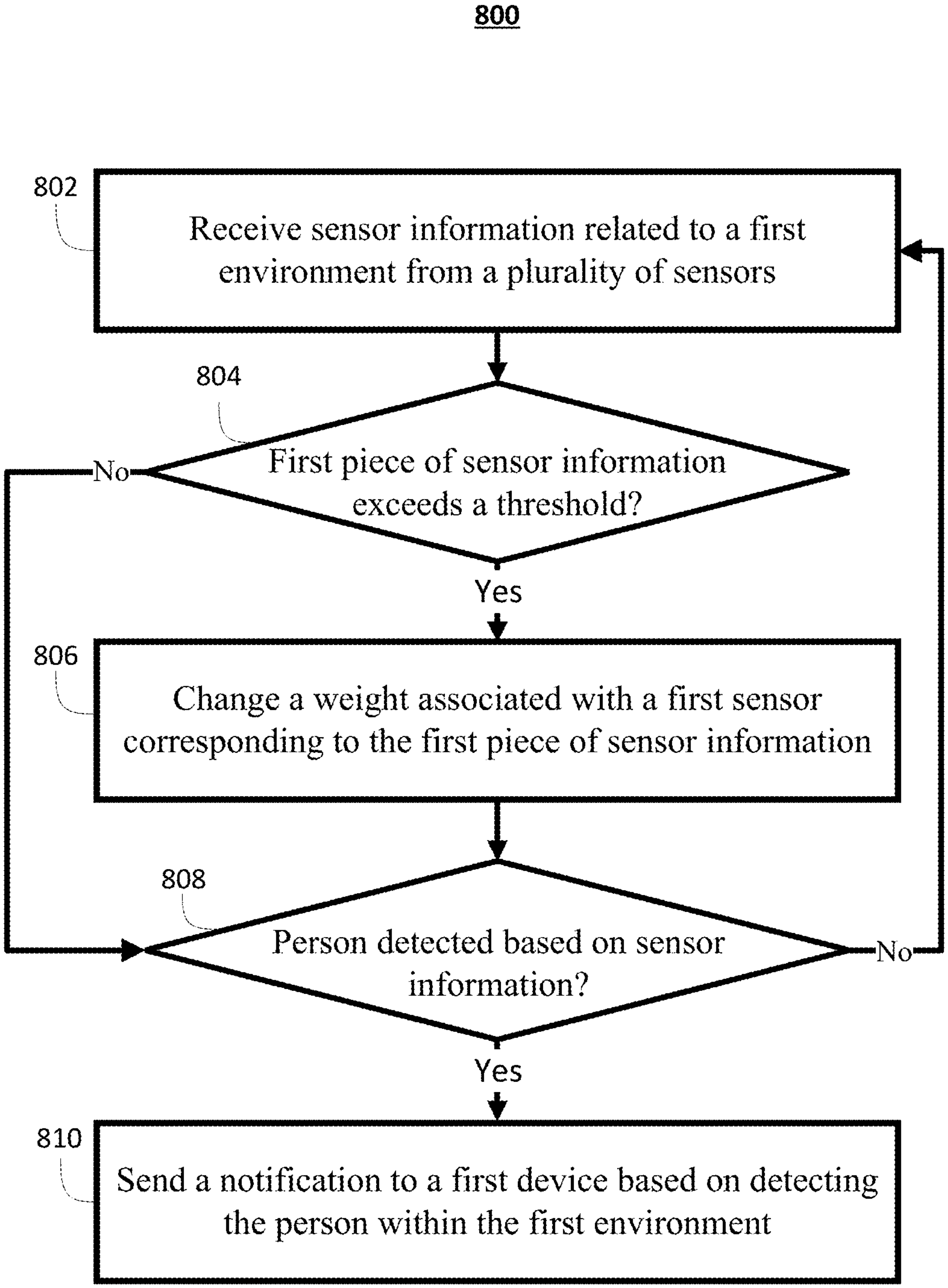
FIG. 8 is another illustrative flowchart of a process for detecting a child in a vehicle and then notifying a user and/or emergency service about the detected child, in accordance with some embodiments of the disclosure.

FIG. 8 is another illustrative flowchart of a process for detecting a child in a vehicle and then notifying a user and/or emergency service about the detected child, in accordance with some embodiments of the disclosure.

At 802, control circuitry receives sensor information related to a first environment from a plurality of sensors. In some embodiments, the first environment corresponds to the inside of a vehicle and the vehicle comprises a plurality of RF sensors and a plurality of audio sensors. Sensor information may refer to any information (e.g., CSI, audio information, and/or similar such information) captured and/or determined from the plurality of sensors. For example, the plurality of RF sensors may generate signals that result in an observed set of relationships between known characteristics of transmitted signals and observed characteristics of received signals. The control circuitry may analyze the transmitted signals and corresponding received signals to determine the CSI associated with the first environment. In another example, the plurality of audio sensors may collect audio information related to the first environment.

At 804, control circuitry determines whether a first piece of sensor information exceeds a threshold. In some embodiments, the threshold corresponds to a detected activity level. For example, a first audio sensor may collect a first piece of sensor information (e.g., one or more audio waves that exceed a detected activity level threshold). In some embodiments, the first audio sensor may collect the first piece of sensor information that exceeds the threshold due to one or more reasons (e.g., the first audio sensor being closer to the origin of the audio waves. In another example, a first RF sensor may detect a first piece of sensor information (e.g., CSI) that exceeds the threshold. In some embodiments, the first RF sensor may detect the first piece of sensor information that exceeds the threshold due to one or more reasons (e.g., the first RF sensor being closer to an object). In some embodiments, if the control circuitry determines that the first piece of sensor information exceeds the threshold, then the control circuitry identifies the sensor associated with the first piece of sensor information as a candidate for boosting. If the control circuitry determines that a first piece of sensor information exceeds the threshold, then the process 800 continues to step 806. If the control circuitry determines that a first piece of sensor information does not exceed the threshold, then the process 800 continues to step 810.

At 806, control circuitry changes a weight associated with a first sensor corresponding to the first piece of sensor information. In some embodiments, the first sensor is the sensor that collected the first piece of sensor information that exceed the threshold at step 806. In some embodiments, the control circuitry assigns a higher weight to the first sensor compared to a weight assigned to other sensors of the plurality of sensors.

At 808, control circuitry determines whether a person is detected based on the received sensor information. For example, the control circuitry may use CSI received from the plurality of RF sensors at step 802 and audio information received from the plurality of audio sensors at step 802 to determine that a person is located within the first environment. In some embodiments, the control circuitry determines that a person is detected in the first environment based on the received sensor information received at step 802 and the higher weight assigned to the first sensor at step 806. In some embodiments, the control circuitry removes redundant sources and reduces the possibility of overfitting of a neural network by assigning different weights depending on detected activity. If the control circuitry determines that a person is detected based on the sensor information, the process 800 continues to step 810. If the control circuitry determines that a person is not detected based on the sensor information, the process 800 returns to step 802.

At 810, control circuitry sends a notification to a first device based on detecting the person within the first environment. In some embodiments, the control circuitry sends the notification to the first device using the same or similar methodologies described at step 610 above.

Figure 9:
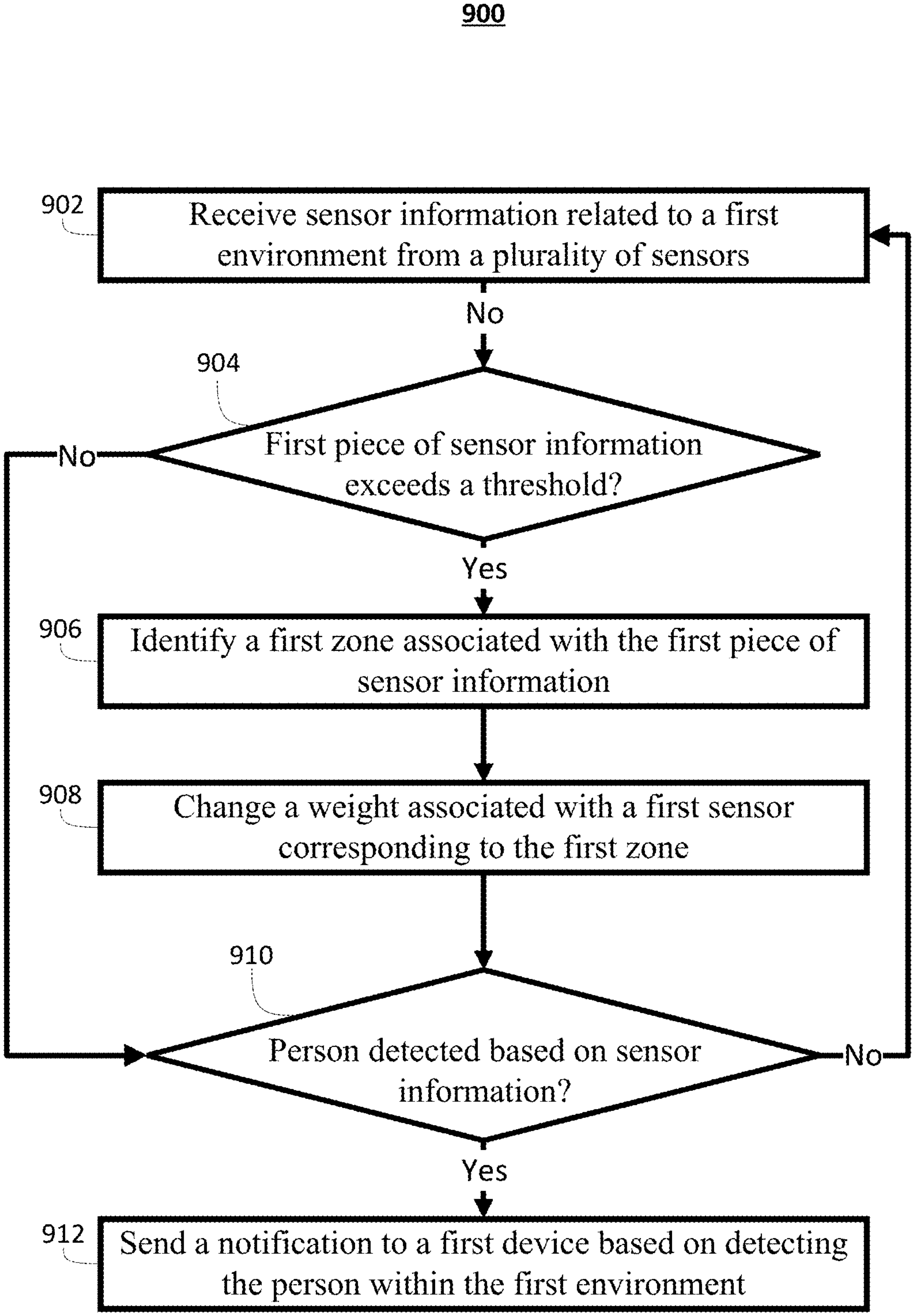
FIG. 9 is another illustrative flowchart of a process for detecting a child in a vehicle and then notifying a user and/or emergency service about the detected child, in accordance with some embodiments of the disclosure.

FIG. 9 is another illustrative flowchart of a process for detecting a child in a vehicle and then notifying a user and/or emergency service about the detected child, in accordance with some embodiments of the disclosure.

At 902, control circuitry receives sensor information related to a first environment from a plurality of sensors. In some embodiments, the control circuitry uses the same or similar methodologies described at step 802 above.

At 904, control circuitry determines whether a first piece of sensor information exceeds a threshold. If the control circuitry determines that a first piece of sensor information exceeds a threshold, the process 900 continues to step 906. If the control circuitry determines that a first piece of sensor information does not exceed a threshold, the process 900 continues to step 910. In some embodiments, the control circuitry uses the same or similar methodologies described at step 804 above.

At 906, control circuitry identifies a first zone associated with the first piece of sensor information. In some embodiments, the first environment comprises a plurality of zones (e.g., front, back, floor, middle seat, trunk, etc.). The control circuitry may determine a zone of the plurality of zones where the increased activity was detected based on the first piece of sensor information that exceeded the threshold at step 906. For example, the control circuitry may use a neural network to determine that the first piece of sensor information indicates increased activity in zone 1.

At 908, control circuitry changes a weight associated with a first sensor corresponding to the first zone. In some embodiments, one or more sensors of the plurality of sensors are associated with different zones of the first environment. For example, a first RF sensor may be associated with a first zone and a second RF sensor may be associated with a second zone. In another example, a first audio sensor may be associated with a first zone and a second audio sensor may be associated with a second zone. The control circuitry may identify that the first sensor that captured the first piece of sensor information that exceeded the threshold at step 904 is associated with the first zone. The control circuitry may then assign a higher weight to the first sensor (e.g., first RF sensor, first audio sensor, etc.) associated with the first zone compared to a weight assigned to one or more other sensors (e.g., second RF sensor, second audio sensor, etc.) associated with other zones (e.g., second zone). In some embodiments, the first sensor did not capture the first piece of sensor information that exceeded the threshold at step 906 but is associated with the first zone. In such an embodiment, the control circuitry assigns a higher weight to the first sensor (e.g., first RF sensor, first audio sensor, etc.) associated with the first zone compared to a weight assigned to one or more other sensors (e.g., second RF sensor, second audio sensor, etc.) associated with other zones (e.g., second zone).

At 910, control circuitry determines whether a person is detected based on the received sensor information. For example, the control circuitry may use both CSI received from the plurality of RF sensors at step 902 and audio information received from the plurality of audio sensors at step 902 to determine that a person is located within the first environment. In some embodiments, the control circuitry determines that a person is detected in the first environment based on the sensor information received at step 902 and the higher weight assigned to the first sensor at step 908. If the control circuitry determines that a person is detected based on the sensor information, the process 900 continues to step 912. If the control circuitry determines that a person is not detected based on the sensor information, the process 900 returns to step 902.

At 912, control circuitry sends a notification to a first device based on detecting the person within the first environment. In some embodiments, the control circuitry sends the notification to the first device using the same or similar methodologies described at step 610 above.

It is contemplated that some suitable steps or suitable descriptions of FIGS. 6-9 may be used with other suitable embodiments of this disclosure. In addition, some suitable steps and descriptions described in relation to FIGS. 6-9 may be implemented in alternative orders or in parallel to further the purposes of this disclosure. For example, some suitable steps may be performed in any order or in parallel or substantially simultaneously to reduce lag or increase the speed of the system or method. Some suitable steps may also be skipped or omitted from the process. Furthermore, it should be noted that some suitable devices or equipment discussed in relation to FIGS. 1-5 could be used to perform one or more of the steps in FIGS. 6-9.

The processes discussed above are intended to be illustrative and not limiting. For instance, the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

receiving channel state information (CSI) related to a first environment from a plurality of radio frequency (RF) sensors, wherein the first environment comprises a plurality of zones;

detecting a person in a first zone of the plurality of zones using the received CSI;

changing a weight corresponding to a first microphone of a plurality of microphones in response to detecting the person in the first zone using the received CSI, wherein the weight is changed based, at least in part, on the first microphone being associated with the first zone;

receiving audio information related to the first environment from the plurality of microphones;

detecting the person in the first zone using the received audio information, wherein the person is detected in the first zone based, at least in part, on weighting audio information collected by the first microphone according to the changed weight; and sending a notification to a first device based on (a) detecting the person using the received CSI and (b) detecting the person using the received audio information, wherein the notification indicates that the person was detected.

2. The method of claim 1, wherein the first environment corresponds to a vehicle's interior.

3. The method of claim 2, further comprising unlocking one or more doors of the vehicle based on (a) detecting the person in the first zone using the received CSI and (b) detecting the person in the first zone using the received audio information.

4. The method of claim 2, further comprising lowering one or more windows of the vehicle based on (a) detecting the person in the first zone using the received CSI and (b) detecting the person in the first zone using the received audio information.

5. The method of claim 1, wherein the plurality of RF sensors include at least one Wi-Fi transceiver.

6. The method of claim 5, wherein the notification is sent using the at least one Wi-Fi transceiver.

7. The method of claim 1, wherein the notification is sent using Bluetooth.

8. The method of claim 1, wherein detecting the person in the first zone using the received CSI further comprises detecting the person in the first zone based, at least in part, on a neural network processing the received CSI.

9. The method of claim 1, wherein detecting the person in the first zone using the received audio information, further comprises:

receiving a plurality of audio waves from the plurality of microphones;

transforming the plurality of audio waves into a plurality of spectral components; and detecting the person in the first zone based, at least in part, on a neural network processing the spectral components.

10. The method of claim 1, wherein detecting the person in the first zone using the received CSI further comprises:

comparing a first piece of CSI received from a first RF sensor of the plurality of RF sensors to a first threshold;

determining that the first piece of CSI exceeds the first threshold;

changing a weight associated with the first RF sensor based on determining that the first piece of CSI exceeds the first threshold;

receiving additional CSI related to the first environment from the plurality of RF sensors; and detecting the person in the first zone based, at least in part, on a neural network processing the additional CSI and using the weight associated with the first RF sensor.

11. The method of claim 1, wherein:

each microphone of the plurality of microphones is associated with at least one zone of the plurality of zones.

12. The method of claim 1, wherein:

each RF sensor of the plurality of RF sensors is associated with at least one zone of the plurality of zones; and detecting the person in the first zone using the received CSI further comprises:

comparing a first piece of CSI received from a first RF sensor of the plurality of RF sensors to a first threshold, wherein the first RF sensor is associated with the first zone of the plurality of zones;

determining that the first piece of CSI exceeds the first threshold;

changing a weight corresponding to one or more RF sensors of the plurality of RF sensors associated with the first zone based on determining that the first piece of CSI exceeds the first threshold;

receiving additional CSI related to the first environment from the plurality of RF sensors; and detecting the person in the first zone based, at least in part, on a neural network processing the additional CSI and using the weight corresponding to the one or more RF sensors of the plurality of RF sensors associated with the first zone.

13. An apparatus, comprising:

control circuitry; and at least one non-transitory computer-readable memory device storing computer-executable instructions, the at least one non-transitory computer-readable memory device and the control circuitry configured to cause the apparatus to perform at least the following:

receive channel state information (CSI) related to a first environment from a plurality of radio frequency (RF) sensors, wherein the first environment comprises a plurality of zones;

detect a person in a first zone of the plurality of zones using the received CSI;

change a weight corresponding to a first microphone of a plurality of microphones in response to detecting the person in the first zone using the received CSI, wherein the weight is changed based, at least in part, on the first microphone being associated with the first zone;

receive audio information related to the first environment from the plurality of microphones;

detect the person in the first zone using the received audio information, wherein the person is detected in the first zone based, at least in part, on weighting audio information collected by the first microphone according to the changed weight; and transmit a notification to a first device based on (a) detecting the person using the received CSI and (b) detecting the person using the received audio information, wherein the notification indicates that the person was detected.

14. The apparatus of claim 13, wherein the first environment corresponds to a vehicle's interior.

15. The apparatus of claim 14, wherein the apparatus is further caused to unlock one or more doors of the vehicle based on (a) detecting the person in the first zone using the received CSI and (b) detecting the person in the first zone using the received audio information.

16. A method comprising:

receiving channel state information (CSI) related to a first environment from a plurality of radio frequency (RF) sensors, wherein the first environment comprises a plurality of zones;

detecting a person in a first zone of the plurality of zones using the received CSI;

receiving audio information related to the first environment from a plurality of microphones, wherein the received audio information comprises audio information collected by a first microphone of the plurality of microphones and audio information collected by a second microphone of the plurality of microphones;

assigning a first weight to the audio information collected by the first microphone, wherein the first microphone is associated with the first zone of the plurality of zones;

assigning a second weight to the audio information collected by the second microphone, wherein the second microphone is associated with a second zone of the plurality of zones;

changing the first weight to a third weight in response to detecting the person in the first zone using the received CSI, wherein the first weight is changed to the third weight based, at least in part, on the first microphone being associated with the first zone;

detecting the person in the first zone using the received audio information; and sending a notification to a first device based on (a) detecting the person in the first zone using the received CSI and (b) detecting the person in the first zone using the received audio information, wherein the notification indicates that the person was detected.

17. The method of claim 16, wherein:

the person is detected based, at least in part, on the received audio information, the third weight assigned to the audio information collected by the first microphone, and the second weight assigned to the audio information collected by the second microphone.

* * * * *